(12) United States Patent
Kunc et al.

(10) Patent No.: US 11,623,395 B2
(45) Date of Patent: Apr. 11, 2023

(54) PENETRATING AND ACTUATING NOZZLE FOR EXTRUSION-BASED 3D PRINTING

(71) Applicant: UT-BATTELLE, LLC, Oak Ridge, TN (US)

(72) Inventors: Vlastimil Kunc, Concord, TN (US); Seokpum Kim, Knoxville, TN (US); John M. Lindahl, Knoxville, TN (US); Jordan A. Failla, Signal Mountain, TN (US); Chad E. Duty, Loudon, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/509,585

(22) Filed: Oct. 25, 2021

(65) Prior Publication Data

US 2022/0040920 A1 Feb. 10, 2022

Related U.S. Application Data

(62) Division of application No. 16/135,548, filed on Sep. 19, 2018, now abandoned.
(Continued)

(51) Int. Cl.
| | |
|---|---|
| B29C 64/00 | (2017.01) |
| B29C 64/209 | (2017.01) |
| B29C 64/106 | (2017.01) |
| B29C 64/165 | (2017.01) |
| B29C 70/06 | (2006.01) |

(Continued)

(52) U.S. Cl.
CPC ............ *B29C 64/209* (2017.08); *B29C 48/19* (2019.02); *B29C 48/22* (2019.02); *B29C 64/00* (2017.08); *B29C 64/10* (2017.08); *B29C 64/106* (2017.08); *B29C 64/118* (2017.08); *B29C 64/165* (2017.08); *B29C 64/176* (2017.08); *B29C 64/182* (2017.08); *B29C 64/20* (2017.08); *B29C 64/205* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/40* (2017.08); *B29C 70/06* (2013.01); *B33Y 40/00* (2014.12); *B33Y 40/10* (2020.01); *B33Y 40/20* (2020.01); *B33Y 50/00* (2014.12); *B33Y 70/00* (2014.12); *B33Y 80/00* (2014.12); *B33Y 99/00* (2014.12); *B29C 64/232* (2017.08); *B29C 64/295* (2017.08); *B29C 64/336* (2017.08);
(Continued)

(58) Field of Classification Search
CPC .............................. B29C 64/209; B33Y 40/00
See application file for complete search history.

(56) References Cited

U.S. PATENT DOCUMENTS

| | | | |
|---|---|---|---|
| 6,719,846 | B2 | 4/2004 | Nakamura et al. |
| 9,475,233 | B2 | 10/2016 | Schmehl |

(Continued)

*Primary Examiner* — Nicholas R Krasnow
(74) *Attorney, Agent, or Firm* — Pauley Erickson & Swanson

(57) ABSTRACT

An apparatus and device for creating a vertical strengthening feature within a 3D printed article of manufacture for improving mechanical performance in the Z-direction. Fill material is deposited in voids vertically crossing multiple layers during the build of 3D printing. The device includes a penetrating extension that fits within the void to create a vertical strengthening feature via heat and/or extruded fill material. The size and/or movement of the heated extension can impact the void side walls to reflow the build material and blend the layers together within the void side walls.

22 Claims, 8 Drawing Sheets

Related U.S. Application Data

(60) Provisional application No. 62/561,731, filed on Sep. 22, 2017.

(51) Int. Cl.

| | | |
|---|---|---|
| B33Y 40/00 | (2020.01) | |
| B29C 48/19 | (2019.01) | |
| B29C 48/22 | (2019.01) | |
| B29C 64/118 | (2017.01) | |
| B29C 64/20 | (2017.01) | |
| B29C 64/40 | (2017.01) | |
| B33Y 40/20 | (2020.01) | |
| B29C 64/245 | (2017.01) | |
| B33Y 40/10 | (2020.01) | |
| B33Y 70/00 | (2020.01) | |
| B33Y 80/00 | (2015.01) | |
| B33Y 50/00 | (2015.01) | |
| B29C 64/255 | (2017.01) | |
| B29C 64/10 | (2017.01) | |
| B29C 64/182 | (2017.01) | |
| B29C 64/176 | (2017.01) | |
| B29C 64/205 | (2017.01) | |
| B29C 64/25 | (2017.01) | |
| B29C 64/307 | (2017.01) | |
| B33Y 99/00 | (2015.01) | |
| B29C 64/30 | (2017.01) | |
| B29C 64/227 | (2017.01) | |
| B29C 64/232 | (2017.01) | |
| B29C 64/295 | (2017.01) | |
| B29C 64/336 | (2017.01) | |
| B29K 307/04 | (2006.01) | |
| B33Y 30/00 | (2015.01) | |
| B33Y 10/00 | (2015.01) | |
| B29K 55/02 | (2006.01) | |

(52) U.S. Cl.
CPC ...... *B29K 2055/02* (2013.01); *B29K 2307/04* (2013.01); *B33Y 10/00* (2014.12); *B33Y 30/00* (2014.12)

(56) References Cited

U.S. PATENT DOCUMENTS

| | | |
|---|---|---|
| 2002/0083895 A1 | 7/2002 | Nakamura et al. |
| 2003/0111599 A1 | 6/2003 | Staats |
| 2003/0127536 A1 | 7/2003 | Donley et al. |
| 2003/0205315 A1 | 11/2003 | McGlinchy et al. |
| 2003/0222160 A1 | 12/2003 | Gordon |
| 2009/0101629 A1 | 4/2009 | Adams |
| 2013/0337164 A1 | 12/2013 | Huang et al. |
| 2014/0124537 A1 | 5/2014 | Urquhart et al. |
| 2016/0136885 A1 | 5/2016 | Nielsen-Cole et al. |
| 2017/0094726 A1 | 3/2017 | Elserman et al. |
| 2018/0065300 A1 | 3/2018 | Tyler et al. |
| 2018/0065318 A1 | 3/2018 | Tyler |
| 2018/0311891 A1 | 11/2018 | Duty et al. |
| 2019/0091927 A1 | 3/2019 | Kunc et al. |
| 2019/0299522 A1 | 10/2019 | Chapiro et al. |
| 2020/0061910 A1 | 2/2020 | Lewis et al. |

PENETRATING AND ACTUATING NOZZLE FOR EXTRUSION-BASED 3D PRINTING

CROSS REFERENCE TO RELATED APPLICATION

This application is a divisional application of U.S. patent application Ser. No. 16/135,548, filed on 19 Sep. 2018, which claims the benefit of U.S. Provisional Application Ser. No. 62/561,731, filed 22 Sep. 2017. The parent application is hereby incorporated by reference herein in their entirety and are made a part hereof, including but not limited to those portions which specifically appear hereinafter.

GOVERNMENT SUPPORT CLAUSE

This invention was made with government support under Contract No. DE-AC05-00OR22725 awarded by the U.S. Department of Energy. The government has certain rights in the invention.

FIELD OF THE INVENTION

This invention relates to 3D printing or additive manufacturing, and more particularly to a nozzle and methods for improved strength in the out-of-plane or Z-axis direction.

BACKGROUND OF THE INVENTION

The popularity of 3D printing has grown sharply in the last several years due primarily to the emergence of the desktop 3D printer, generically known as fused filament fabrication (FFF) or additive manufacturing. Extrusion-based 3D printing systems generally build up three-dimensional parts by depositing two-dimensional layers in a successive fashion. This typically involves directing a nozzle along a specific pattern in the horizontal (X-Y) plane and incrementing along the Z-axis. However, the utilization of FFF technology is largely restricted to the production of demonstration pieces, models, and prototypes that test only the form and fit of a given design. The functionality of a printed component is often limited by poor mechanical performance. Although engineering polymers, such as acrylonitrile butadiene styrene (ABS), are used for 3D printing applications, the component-level strength of a printed part can be a fraction (as low as 25-50%) of the known reference strength for that material.

The relatively poor mechanical performance of FFF parts is largely due to the manner in which material is deposited during the extrusion-based printing process. Although the technology is popularly referred to as "3D printing", the traditional approach to building a three dimensional geometry by successively stacking 2D layers of deposited material can more accurately described as '2.5-D printing'. The layered structure of a traditionally-printed component is immediately apparent by close inspection of a given cross section. Using the conventional nomenclature where the deposition plane is the X-Y plane and the Z-axis is directed vertically across layers, it is evident that FFF printing can align continuous material in any specific direction within the X-Y plane, but there is no continuous material crossing between successive layers. Therefore, transferring a load in the Z-direction must occur across the discrete bonded areas where the deposited beads in successive layers interact. At best, these bonded areas are intermittent across a given load path and are subject to stress concentrations due to the sharp interfaces where the curved surfaces of the beads intersect. There is a continuing need for improved FFF techniques that impart strength and stability to printed components.

SUMMARY OF THE INVENTION

The invention generally relates to improving structural strength in 3D printed articles, and more particularly to an improved nozzle and methods of use.

U.S. patent application Ser. No. 15/965,106, herein incorporated by reference discloses a method of joining layers of these materials together in the Z-direction (referred to as Z-pinning) The method includes leaving void areas within and through several deposited X-Y layers, and depositing a fill material within the void to pin the X-Y layers together.

The present invention is directed to methods of 'Z-pinning' layers together and includes a penetrating structure, such as a deposition nozzle, that extends into the voids to impart additional structural rigidity, such as via forming a strengthening feature within the voids. For example, the invention includes a penetrating and actuating nozzle that physically extends into voids of a printed part, and extrudes material as the nozzle is withdrawn from the inside of the voids. This approach can allow for deeper penetrating and/or more uniform void fill layers, and therefore achieves a much higher fill percentage and better interlocking features with the surrounding material in the voids.

In embodiments of this invention, the "Z-pinning" approach deposits continuous material layers in a 3D printed component along a third dimension (the Z axis), effectively stitching together the layered structure (along the X-Y axis). Embodiments of this invention also allows for the polymer material exiting the nozzle to be at a higher temperature as it exits the nozzle and comes into contact with the walls of the voids. This improvement promotes not only a better connection amongst materials, but it also allows for significantly better flow of the Z-pins as material exits the nozzle, rather than just filling the voids from the top of a hole.

The invention includes a device for forming a strengthening feature in a void that extends through a plurality of layers of a three-dimensionally printed composite. The device includes a moveable arm with a penetrating extension at an end of the moveable arm. The penetrating extension has a size and shape that allows it to fit within a void. The void may have a depth measured in a Z-axis direction, with a diameter that is measured perpendicular to the depth. The penetrating extension may have a same or smaller outer diameter than that of the void, such as to promote contact or close proximity for contact and/or heat transfer. The penetrating extension may be the same shape as the void, thereby allowing the penetrating extension to be inserted into the void. The length of the penetrating extension may be at least fifty percent of the depth of the void. The penetrating extension may also rotate when inside the void. The penetrating extension may also be in the form of a heated rod. The rod can be coated with a chosen heat-resistant, non-stick material.

In embodiments of this invention, the device includes a nozzle including the penetrating extension. In one embodiment of the invention, the nozzle includes more than one penetrating extension, wherein each penetrating extension can be inserted into a separate void. The penetrating extension of the nozzle desirably includes a longitudinal side wall enclosing an internal passage and a bottom end. There is at least one extrusion hole at the bottom end of the nozzle, connecting to the internal passage, for extruding and depositing a flowing build material.

The invention further comprehends a device for forming a strengthening feature in a void that extends through a plurality of layers of a three-dimensionally printed composite. This device includes a nozzle that can both receive and deposit a polymer material into the void. The polymer material can be deposited into the void by utilizing a penetrating extension that is included in the nozzle. This penetrating extension is sized and shaped to be able to insert it into the void of the printed composite, to then deposit the polymer material into the void. The penetrating extension of the nozzle of this invention fills voids better due to better flow at all levels of the composite and material layers.

The nozzle of this device also includes a longitudinal side wall and a bottom end. The side wall has at least one nozzle outlet. The nozzle outlet is connected to a polymer passageway that runs through the penetrating extension. For insertion into the void, the penetrating extension has a length that is desirably at least fifty percent of a depth of the void. The penetrating extension further may be one of many polygonal shapes. For example, in one embodiment of the invention the penetrating extension may be in the shape of a rectangle. The rectangular-shaped penetrating extension may then rotate within the void when it is inserted in the void. The rotation of the rectangular penetrating extension results in the penetrating extension making contact with at least one wall of the void. In another embodiment of the invention, the void and the nozzle may have differing diameters through different depths of the void.

The invention still further comprehends a method for additive manufacturing. The method includes depositing at least one layer of a material in a two-dimensional plane and defining a void which has a depth that is perpendicular to the two-dimensional plane. A nozzle is then inserted into the void. The nozzle is able to receive and deposit a polymer material into the void at an interval in accordance with the layer(s) of material.

Other objects and advantages will be apparent to those skilled in the art from the following detailed description taken in conjunction with the appended claims and drawings.

DETAILED DESCRIPTION OF THE INVENTION

The present invention provides a device and method for forming a strengthening feature in a void that extends through a plurality of layers of a three-dimensionally printed composite. The invention includes a penetration extension that physically extends into Z-direction voids of a printed part for forming Z-direction strengthening structures within the void. This promotes not only a better connection amongst materials, but it also allows for significantly better flow of a Z-pin polymer material in extrusion-based three-dimensional printing.

Figure 1:
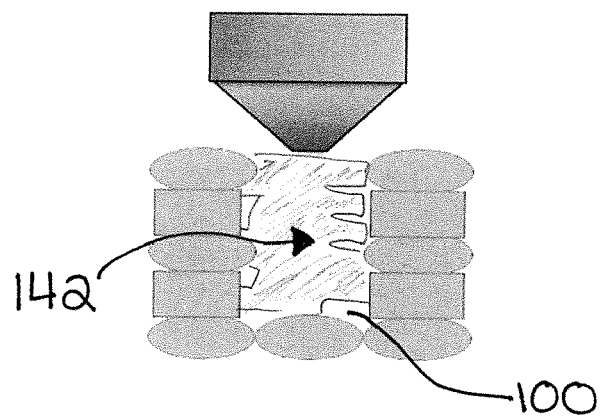
FIGS. 1 and 2 illustrate a Z-pinning using conventional nozzles.
Figure 2:
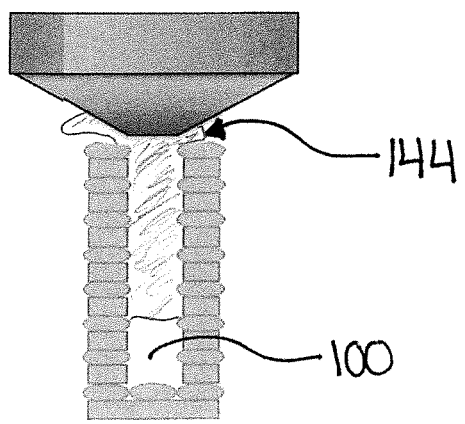

FIGS. 1 and 2 illustrate issues that can occur when using conventional extrusion printing nozzles for Z-direction filling FIG. 1 shows a void 100 sized too large relative to the nozzle, resulting in an under-fill 142 condition (like a rope in a bucket), which leads to poor integration with the surrounding materials and the void 100. FIG. 2 shows an over-fill 144 condition where the nozzle only provides partial extrusion into the void 100 before the fill material contacts the side of the void 100 and prematurely fill the void 100—leaving the bottom of the void 100 empty and the top overflowing with fill material. In both examples, the overall integration and strength is less than intended. As will be discussed further below, the penetrating extension of this invention allows for improved void fill over that illustrated in FIGS. 1 and 2.

Embodiments of this invention include a 3D printing device with a void-penetrating structure that can form a strengthening feature and/or provide better fill in a void that extends through a plurality of layers of a three-dimensionally printed composite.

Figure 3:
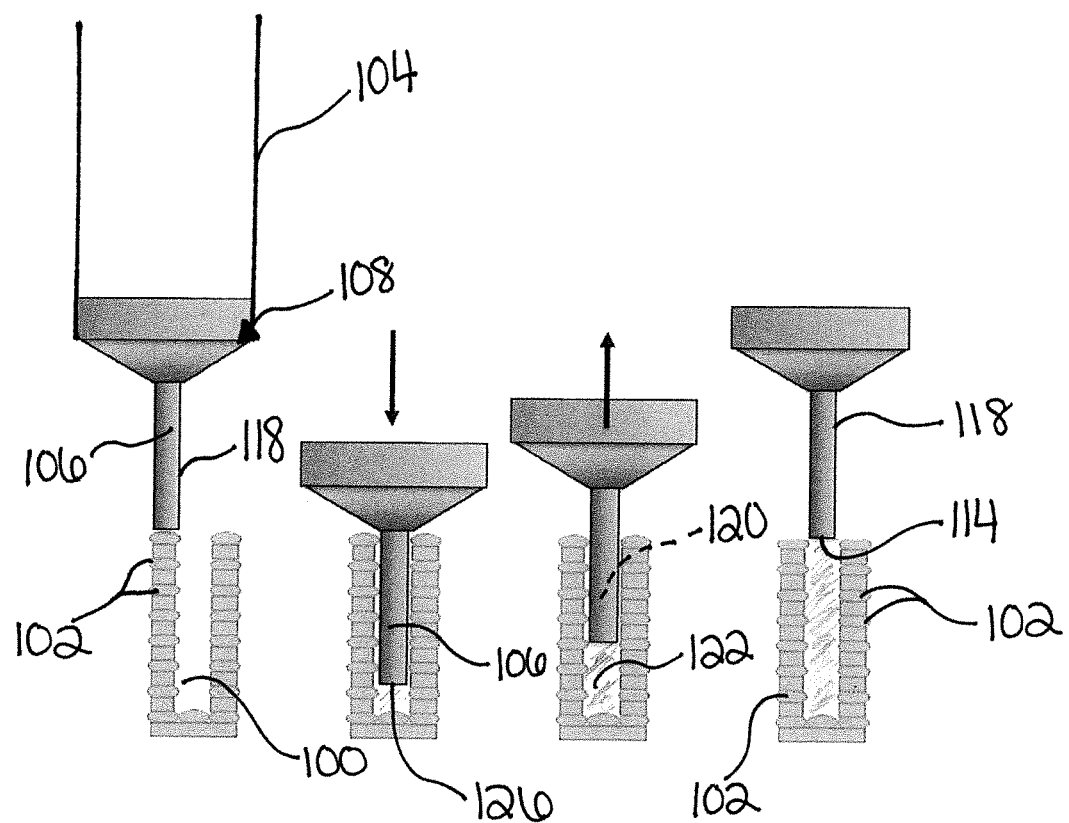
FIG. 3 shows a device depositing a polymer material into a void, according to one embodiment of this invention.

FIG. 3 illustrates a penetrating nozzle 108 attached to a moveable arm 104 for moving the nozzle 108 over a deposition surface to deposit build layers 102. The nozzle 108 includes a penetrating extension 106 having a size and shape that allow the extension 106 to fit down within the Z-direction void 100 within material layers 102 stacked in parallel two-dimensional planes. The void 100 has a depth measured in a Z-axis direction (or perpendicular to the X-Y plane of layers 102), with a diameter that is measured perpendicular to the depth. The penetrating extension 106 has a smaller diameter than that of the void 100, thereby allowing the extension 106 to fit down in the void 100 as shown in FIG. 3. The penetrating extension 106 also has a same cross-sectional shape as the void 100 to allow insertion.

It is not necessary that the penetrating extension 106 extend the entire length of the void 100, but should extend enough to provide sufficient back-pressure to allow complete filing of the void 100 during an extrusion. In other embodiments, the penetrating extension 106 may be 25-75% of the depth of the void 100. In preferred embodiments of this invention, the penetrating extension 106 has a length of at least 50% of the depth of the corresponding void 100.

As shown in FIG. 3, the nozzle 108 is inserted down into the void 100. The nozzle 108 receives and deposits a polymer material 122, or other suitable build material, into the void 100 at an interval in accordance with the layer(s) of material. The penetrating extension 106 includes an internal passage 120 to pass the deposition material through the nozzle into the void 100. The nozzle 108 and/or penetrating extension 106 may further be heated to assist in receiving and depositing the polymer material 122 into the void 100. A heated penetrating extension 106 can provide additional benefits of warming or reflowing the sides of the void 100, such as to promote adhesion of the fill material.

In FIG. 3, the penetrating extension 106 includes a longitudinal side wall 118, a bottom end 114, and an extrusion opening 126 at the bottom end 114. Additional configurations are available for the penetrating extension according to this invention, depending on need and the size/shape of the void to fill. For example, the nozzle 108 may be equipped with multiple areas of extrusion, including holes on the sides of longitudinal wall 118 that can deposit material directly on the walls of a void 100, with or without filling the entire void space. This may allow for using less material to bind the plurality of layers 102 together in the Z-direction.

Figure 4:
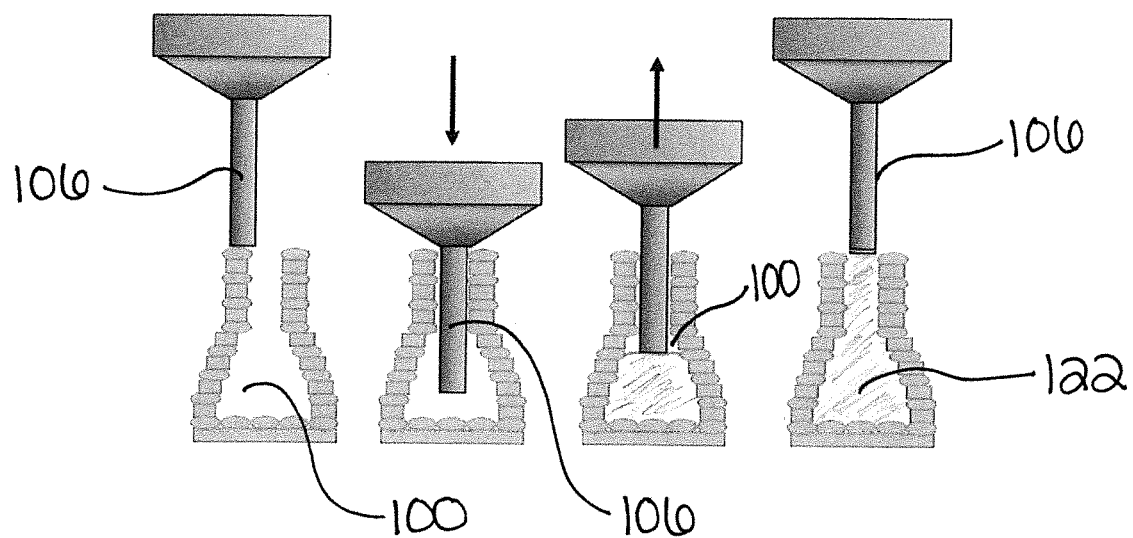
FIG. 4 shows a device depositing a polymer material into a void, according to another embodiment of the invention.

The nozzle and/or penetrating extension of this invention allows for better filling of different void shapes and sizes. For example, FIG. 4 shows a void 100 having a wider bottom than a neck at the top. FIG. 4 shows how a penetrating extension 106 can be inserted down into the widened bottom to better and more completely fill the bell-shaped void bottom.

The penetrating extension of this invention allows for increased localized extrusion pressure near a bottom of a void area, and thus makes the filling of holes of a variety of shapes more effective (for example, where the diameter of the void 100 in lower layers is larger than that of the diameter of the void 100 in upper areas near the top of the layers of material). The expanding, nonlinear void design as seen in FIG. 4 can vary along its length to permit more effective mechanical interlocking of the extruded material. As a further embodiment, the smaller diameter of the void 100 can occur at or near the bottom layers of the void 100.

Figure 5:
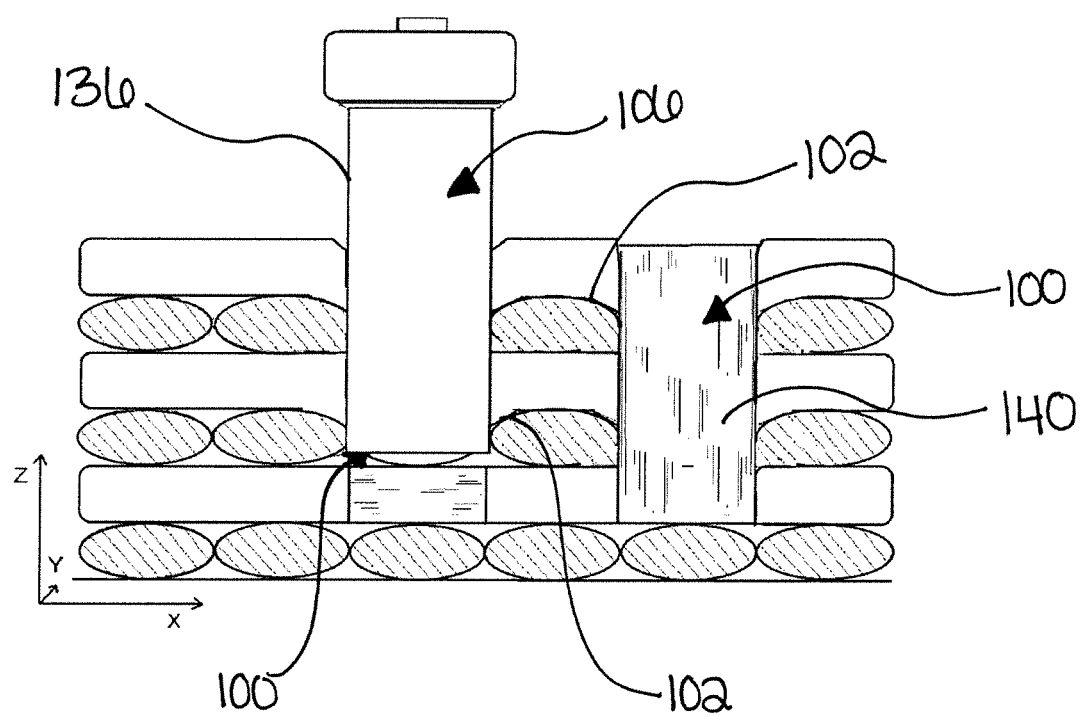
FIG. 5 shows a penetrating extension according to one embodiment of the invention.

In embodiments of this invention, the penetrating extension 106 additionally or alternatively modifies the structure of the void area during the penetration, dwell or extrusion, and/or extraction processes through a mechanical, chemical, and/or thermal operation. FIG. 5 shows an embodiment of the invention where the penetrating extension 106 is a heated rod 134, with or without a polymer extruding nozzle structure. As illustrated, the extension 106 includes a heated solid rod 134 that is shaped to match the geometry of the void 100 (such as a square or rectangle, among other options). The rod 134 is the same size as or just slightly larger than the infill pattern or void diameter. In a typical in-fill pattern of this embodiment, the oversizing of the heated rod 134 can be, for example, about half the radius of the arc of the side of the printed bead or void 100. The size of the penetrating extension 106 provides contact with the sides 140 of the void 100, which reflows the material beads and pushes/pulls the melted material downward and/or upward into the areas between the beads or layers of material, thereby blurring the layers within the void and, upon hardening, forming a more rigid integrated Z-direction structure around the sides 140.

The penetrating extension 106 can be coated with a chosen heat-resistant, non-stick material coating 136. For example, the coating 136 can be a high temperature non-stick ceramic such as Duraceram®, in order to transfer heat while avoiding sticking of material to the piece or penetrating extension 106.

In embodiments of this invention, fiber filled materials are used to form at least the X-Y layer beads. The contact of the penetrating extension with the inner circumferential surface of the void reorients the fibers in this area at least partially in the Z-direction or axis, and further provides cross-layer 102 structural support.

Figure 6A:
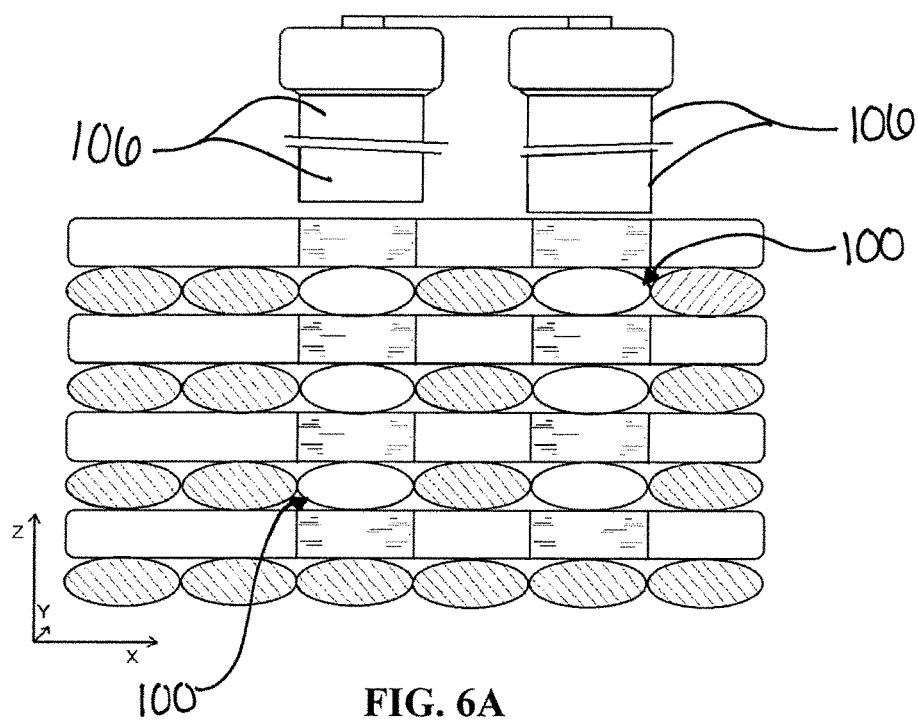
FIGS. 6A and B show a device with more than one penetrating extension, according to another embodiment of the invention.
Figure 6B:
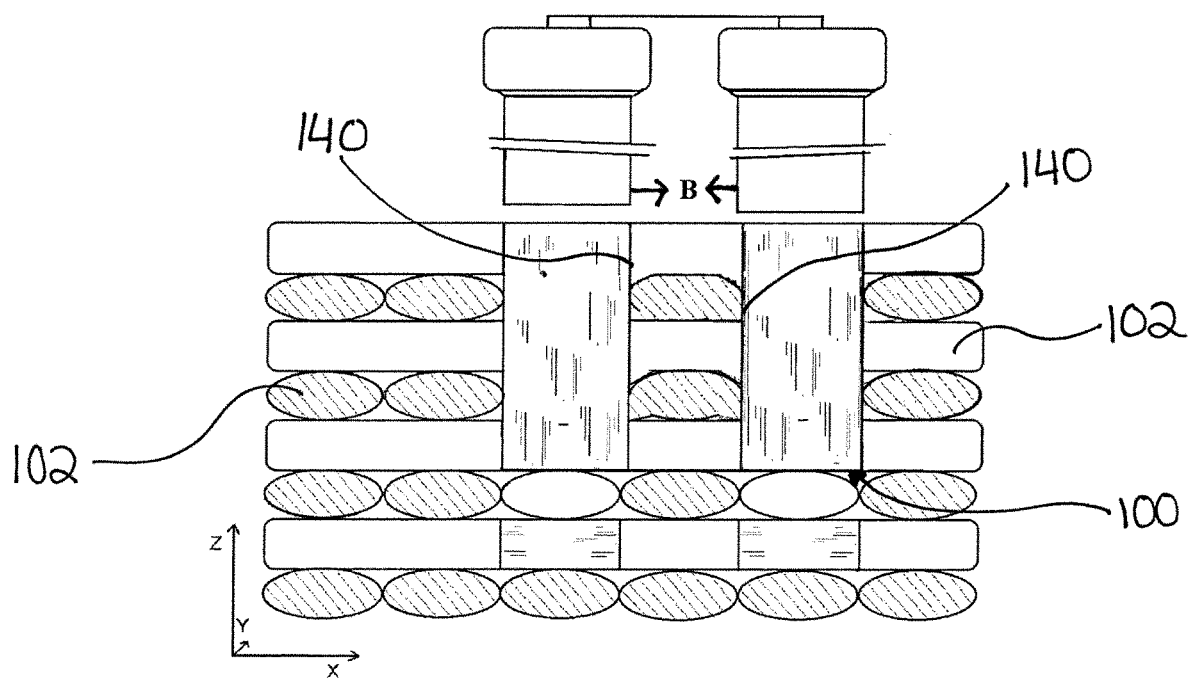

FIGS. 6A and 6B show an additional embodiment, with more than one penetrating extension that act in concert to enter more than one void simultaneously. Each penetrating extension 106 is inserted (for example, like prongs of a fork) into one of two separate, neighboring voids 100. After a number of layers of a material are deposited, the extensions move so that they are hovering just above the voids 100 and then move down into the void area. As the extensions 106 are lowered into the voids 100, the arcs of the beads or walls of the voids are melted by the hot piece or rod and are pushed into the area between the beads or layers of material.

As shown in FIGS. 6A and B, the penetrating extensions 106 may compress inward slightly to point B, so that the walls 140 of the neighboring voids will be heated and pressed into one another. The combination of heat and pressure against the walls of the voids in this embodiment should further bind the plurality of layers 102 of material together and therefore improve the strength in the Z-direction or axis. Once the walls of the voids are pressed inward, the heated rods or penetrating extensions may retract from one another and then be pulled out of the void space. This embodiment can be used in addition to or instead of an extruding nozzle discussed above.

Figure 7:
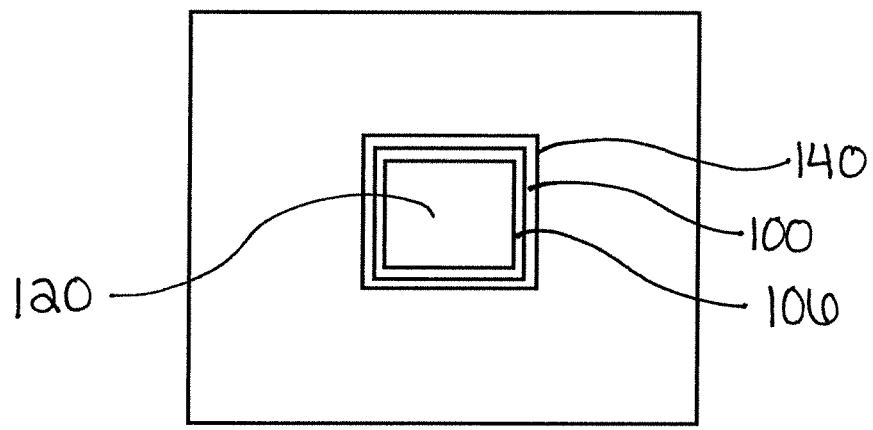
FIG. 7 shows a penetrating extension relative to a build component, according to one embodiment of the invention.
Figure 8:
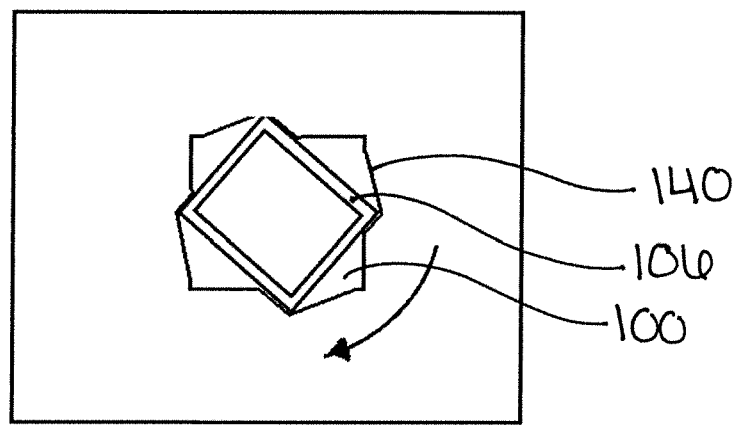
FIG. 8 illustrates an operation of the penetrating extension of FIG. 7.

FIGS. 7 and 8 illustrate a rotating penetrating extension 106 according to another embodiment of this invention. The penetrating extension 106, either a nozzle or solid rod, rotates about the longitudinal axis within the void to contact the sides of the void. The penetrating extension 106 can have any suitable size and/or cross-sectional shape to contact the void sides 140. As one example, the extension has a circular size that is large enough in diameter to interact with the side 140 material in the void 100. FIGS. 7 and 8 illustrate a rectangular shape, whereby when rotated the edges contact and push the side material around the void to form the strengthening feature. Other suitable shapes include, without limitation, triangles, ovals, 'dog bones', hour glass, zig-zag, or numerous other symmetrical or asymmetrical possibilities. In addition, instead of merely rotating on axis, the extension can follow a rotational stirring pattern, or other movement pattern, to contact the void sides.

As illustrated in FIG. 8, the rectangular-shaped penetrating extension 106 rotates within the void 100. The rotation of the rectangular penetrating extension 106 results in the side edges of the penetrating extension 106 making contact with at least one wall 140 of the void 100. This has an effect of smoothing, blurring, and/or enlarging the void or void walls. In another embodiment of the invention, the void 100 may have differing diameters through different depths of the void 100. The penetrating extension can be correspondingly shaped, or achieve a movement pattern, to achieve a specific objective with the side wall material inside the void. Such an example includes a drill-bit style helix to encourage simultaneous vertical and horizontal motions of the material inside the void. Other shape examples may be used with this embodiment such as mixing studs, ribs, and round and rectangular overall shapes. The rotational aspect of this embodiment could be used in addition to, instead of, or simultaneously with the basic penetrating extrusion nozzle of the invention.

Where the penetrating extension of FIG. 8 is a heated nozzle, the extension can begin to rotate upon beginning extrusion. The nozzle will rotate as it is extracted from the void 100, thereby disrupting layers of material. The disruption/reflowing of the void side walls promotes adhesion between the disrupted layers and the newly extruded polymer. In an embodiment with a fiber reinforced material, the device can not only give a vertical orientation to the fiber material (such as carbon fibers), but also should provide strong solid columns of fill material within the printed composite. Once lowered into the void 100, the penetrating extension 106 can rotate, for example, between 45-180° while raising up (and down as needed) within the void 100, to disrupt the walls of the void 100 while also adding a liquid nail polymer as a strengthening feature.

Figure 9:
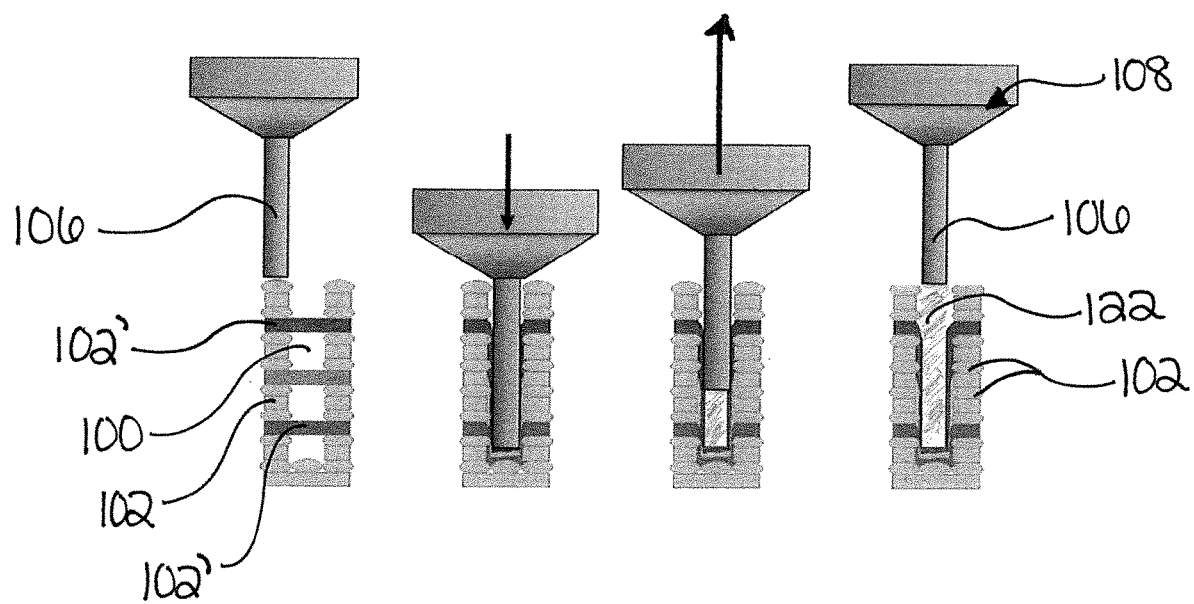
FIG. 9 shows an operation of a penetrating extension, according to another embodiment of the invention.

FIG. 9 shows another embodiment of the invention, where a deep draw nozzle alters the standard print layout of the base material in preparation for a penetration nozzle fill operation. In the standard Z-pinning approach, a continuous void is intentionally left in the printed structure. The void may be aligned in such a way that the nozzle can extrude continuous material to completely fill the hole developed in the void. In the deep draw concept of FIG. 9, the aligned void 100 is discontinuous such that certain intermediate layers 102' extend across or bridge the void 100 among the plurality of layers 102. In this embodiment, the overall void area or hole would consist of non-continuous distinct partial voids that are aligned in the vertical or Z-axis direction. The diameter of each void area could vary (e.g., increase or decrease with depth), or may be constant throughout as shown. As the penetrating extension 106 penetrates into the void 100, it breaks the bridge material 102', and draws (e.g., via heat) the polymer material of the layers 102' deeper into the void space. The result is a strengthening feature based upon effectively redirecting and stitching continuous material from the horizontal plane with the vertically drawn material). The nozzle 108 then extrudes fill material 122 and can be further combined with a rotating motion to assist with either mixing or separating from the surrounding wall material inside the void 100.

Figure 10:
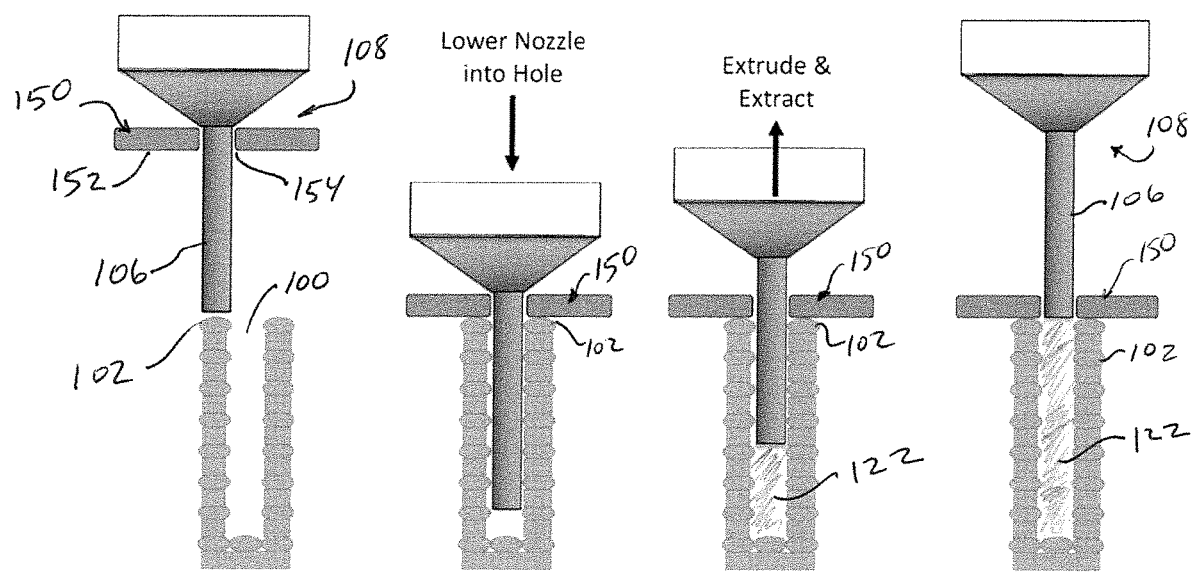
FIG. 10 shows an operation of a penetrating extension, according to another embodiment of the invention.

In embodiments of this invention, a resistive force is applied across the top printed layer during each z-direction fill to allow for successful extraction of the penetrating nozzle. FIG. 10 shows an exemplary embodiment where an extraction platen 150, such as including a plate 152 with a center opening 154, surrounds the penetrating nozzle 108. As the nozzle 108 penetrates into the void 100, the platen moves down to contact the top printed layer 102 of the build. As the nozzle 106 extrudes material and extracts from the void 100, the platen 150 remains in contact with the surrounding build structure, providing a supporting force to prevent the layers 102 from sticking to the nozzle 108 and lifting up (delaminating) that portion of the printed part or possibly having the entire part separate from the deposition surface and stick to the nozzle 108. Once the nozzle 108 has been successfully extracted from the void 100, the platen 150 would move back up to resume the first illustrated position out of contact with the uppermost layer 102, allowing the print head to move normally. A restrictive force mechanism, such as the extraction platen, can be used in combination with the other embodiments described herein.

The extraction platen of embodiments of this invention can be implemented as a modification in movement and/or design to existing reciprocating tamping mechanisms on current printing systems, such as a big area additive manufacturing (BAAM) system. The platen can also be actively heated, cooled, coated, and/or moved (e.g., twist, reciprocate, shear, etc.) to discourage adhesion to the printed structure. The extraction platen can also provide a "smoothing out" of any potential overflow from the z-pins. This feature can even be useful for undersized nozzles that are not intentionally interacting with the side walls of the voids.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for additive manufacturing comprising steps of:
   providing an additive manufacturing device including: a deposition surface; a movable arm having an end; a nozzle on the end of the moveable arm and moveable over the deposition surface, and configured to deposit a polymer material on the deposition surface, the nozzle including a penetrating extension having an extension length and an extension diameter along the extension length;
   depositing a plurality of layers of a first polymer material in two-dimensional planes and defining a void within the plurality of layers, the void having a void depth oriented perpendicular to the two-dimensional planes and a void diameter across the void and perpendicular to the void depth;
   sizing the void diameter such that the extension diameter is substantially equal to the void diameter;
   inserting the penetrating extension of the nozzle into the void; and
   depositing a second polymer material into the void from the nozzle with the penetrating extension inserted into the void.

2. The method of claim 1, further comprising extracting the penetrating extension from the void while depositing the second polymer material into the void, and filling the void with the second polymer material.

3. The method of claim 1, further comprising:
   sizing the void depth such that the extension length is at least 50% of the void depth.

4. The method of claim 1, wherein the void has an increasing or decreasing diameter across the void depth.

5. The method of claim 1, further comprising rotating the penetrating extension within the void to contact at least one inner wall of the void and to smooth or blur the at least one inner wall.

6. The method of claim 1, wherein the penetrating extension comprises a plurality of longitudinal side walls and a bottom end, and each of the longitudinal side walls has a rectangular shape.

7. The method of claim 1, further comprising forming a plurality of voids extending through the plurality of layers, the voids being in a staggered pattern across the two-dimensional planes.

8. The method of claim 1, wherein an extraction platen extends at least partially around, the penetrating extension, and further comprising:
   placing the extraction platen against a top layer of the plurality of layers of the first polymer material; and
   the penetrating extension moving through the extraction platen while extracting from the void to prevent one of the plurality of polymer material layers from sticking to the penetrating extension and delaminating from an other of the plurality of polymer material layers.

9. The method of claim 1, further comprising heating the penetrating extension.

10. The method of claim 1, wherein the penetrating extension is coated with a heat-resistant, non-stick ceramic material.

11. The method of claim 1, further comprising:
    extending an intermediate layer of the plurality of layers across the void to form separated sub-voids;

breaking the intermediate layer with the penetrating extension to connect the sub-voids and form the void; and heating and drawing the polymer material of the intermediate layer down into the void with the penetrating extension.

12. A method for additive manufacturing comprising steps of:

providing an additive manufacturing device including: a deposition surface; a movable arm having an end; a nozzle moveable over the deposition surface, and configured to deposit a polymer material on the deposition surface; and a penetrating extension at the end of the moveable arm and having an extension length and an extension diameter along the extension length;

depositing on the deposition surface a plurality of polymer material layers stacked in an X-Y direction about a space to result in a void extending in a Z-direction through the plurality of polymer material layers, the void having a void depth through the plurality of polymer material layers and the void having a void diameter across the void and perpendicular to the void depth;

sizing the void depth such that the extension length is at least 50% of the void depth;

sizing the void diameter such that the extension diameter is substantially equal to or smaller than the void diameter;

inserting the penetrating extension into the void; and depositing a polymer material into the void using the nozzle.

13. The method of claim 12, wherein the penetrating extension is rotatable on and with respect to the arm, and further comprising rotating the penetrating extension when inserted within the void to contact inner walls of the void and to smooth or blur the inner walls.

14. The method of claim 12, wherein the penetrating extension is heated and coated with a heat-resistant, non-stick ceramic material.

15. The method of claim 12, wherein a nozzle outlet is at an end of the penetrating extension.

16. The method of claim 15, further comprising extracting the penetrating extension from the void while depositing the second polymer material into the void and filling the void.

17. The method of claim 12, wherein depositing the plurality of polymer material layers stacked in an X-Y direction forms a three-dimensionally printed composite, and further comprising forming a plurality of voids in a staggered Z-direction pattern across the X-Y direction of the printed composite.

18. The method of claim 12, further comprising removing residual polymer material from the penetrating extension upon removal from the void.

19. The method of claim 18, wherein an extraction platen extends at least partially around the penetrating extension, and further comprising:

placing the extraction platen against a top layer of the plurality of polymer material layers; and the penetrating extension moving through the extraction platen while extracting from the void to prevent one of the plurality of polymer material layers from sticking to the penetrating extension and delaminating from an other of the plurality of polymer material layers.

20. The method of claim 12, further comprising:

extending an intermediate layer of the plurality of polymer material layers across the void to form a material bridge and separated sub-voids;

breaking the material bridge with the penetrating extension to connect the sub-voids and form the void; and heating and drawing the polymer material of the material bridge down into the void with the penetrating extension during the inserting step.

21. The method of claim 5, wherein the penetrating extension comprises a rectangular cross-sectional shape.

22. The method of claim 13, wherein the penetrating extension comprises a rectangular cross-sectional shape.

* * * * *